United States Patent Office 3,706,775
Patented Dec. 19, 1972

3,706,775
METHOD OF PREPARING HIGH MOLECULAR WEIGHT LINEAR ORGANOPOLYSILOXANES
Siegfried Nitzsche, Jurgen Burkhardt, and Karl-Heinrich Wegehaupt, Burghausen, Upper Bavaria, Germany, assignors to Wacker-Chemie G.m.b.H., Munich, Germany
No Drawing. Filed Dec. 17, 1970, Ser. No. 99,230
Int. Cl. C07f 7/02
U.S. Cl. 260—448.2 E
13 Claims

ABSTRACT OF THE DISCLOSURE

High molecular weight copolymeric diorganopolysiloxanes consisting essentially of diphenylsiloxane and dimethylsiloxane units are prepared by alkaline hydrolysis and condensation of a mixture of 4 to 70 mol percent $(C_6H_5)_2SiCl_2$, 29 to 96 mol percent $(CH_3)_2SiCl_2$ and up to 1 mol percent of other chlorosilanes, employing a solution of 3 to 30 percent by weight of alkali metal hydroxide in water as the hydrolysis medium, separating the hydrolysates from the aqueous medium, and thereafter further condensing and equilibrizing the hydrolysates employing phosphorous-nitrogen compounds as catalysts.

---

This invention is directed to a novel method for preparing high molecular weight copolymers of diphenylsiloxane and dimethylsiloxane units. Such copolymers are particularly useful for preparing silicone rubber products.

The preparation of high molecular weight, linear diorganopolysiloxanes useful for preparing elastomers from various diorganosiloxane units by cohydrolysis and condensation of corresponding diorganochlorosilanes followed by further condensation and equilibration of the resulting hydrolyzates is distinctly preferable to the preparation of similar polymers via polymerization and equilibration of cyclic siloxanes as known from U.S. Pat. No. 2,541,132, in that the expense of purifying cyclic siloxanes with resulting loss of siloxane is avoided.

The method proposed in U.S. Pat. No. 2,484,595 for preparing high molecular weight linear siloxanes which may contain a significant proportion of diphenylsiloxane units in addition to dimethylsiloxane units consists of cohydrolysis and condensation of the appropriate chlorosilanes followed by equilibration. The products of this patented method are gel-like and elastic prior to cure because of the cleavage of phenyl substituents from the silicon during processing, hence, these products are really crosslinked and are not useful or are difficult to use in preparing silicone rubber formulations. (See German patent publication No. 1,208,890, column 1, page 1.)

It is also known from German Pat. No. 1,034,631 that when the standard techniques for hydrolysis of chlorosilanes are employed with mixtures of dimethyldichlorosilane and diphenyldichlorosilane with concurrent condensation of the hydrolyzates, large quantities of solid products are separated and contain high proportions of the phenylsiloxane units, thus the copolymeric siloxane product obtained will contain at most about 20 phenyl radicals per 100 hydrocarbon radicals present.

It is the object of the present invention to introduce a method for preparing essentially linear diorganosiloxane polymers containing significant amounts of diphenylsiloxane units, avoiding the difficulties noted above in the prior art. Another object is a method which leads to linear diorganosiloxane polymers containing a high proportion of diphenylsiloxane units in addition to other diorganosiloxane units, particularly dimethylsiloxane units, in a more direct manner (in contrast, for example, to the method of U.S. Pat. No. 2,541,132) producing polymeric products which are superior to those previously prepared (as, for example, in U.S. Pat. No. 2,484,595), said polymeric products being essentially free of gel formation, hence, readily adaptable to present techniques for compounding silicone rubber stocks and extruding, forming and vulcanizing the stocks to produce excellent and unique silicone rubber products.

This invention is a method of preparing high molecular weight, essentially linear diorganosiloxane polymers by hydrolyzing a mixture of 4 to 70 mol percent diphenyldichlorosilane, 29 to 96 mol percent dimethyldichlorosilane and 0 to 1 mol percent of other organochlorosilanes, to total of the mol percentages being 100, followed by condensation and equilibration of the hydrolyzates, which method employs as the hydrolysis medium an aqueous solution of alkali hydroxide containing 3 to 30 percent by weight of alkali hydroxide based on the total weight of the aqueous solution throughout the hydrolysis, and after the hydrolysis is completed, the hydrolyzate is separated from the aqueous phase and further condensation and equilibration of the hydrolyzate are carried forward employing certain phosphorous-nitrogen compounds as catalysts.

The copolymeric siloxanes of this invention are generally defined as containing 4 to 70 mol percent $(C_6H_5)_2SiO$ units, 29 to 96 mol percent $(CH_3)_2SiO$ units and up to 1 mol percent of $$R_nSiO_{\frac{4-n}{2}}$$

units where R is hydrocarbon radical and $n$ is 0 to 3, preferably $n$ has an average value of 1.99 to 2.01, but because the monomeric dimethyldichlorosilane is more readily available and less expensive while the presence of diphenylsiloxane units in the copolymer introduces excellent low temperature properties (e.g. flexibility and rubberiness below −40° C.) as well as excellent resistance to beta and gamma rays, it has been found desirable to employ 5 to 40 mol percent $(C_6H_5)_2SiCl_2$ with the balance of the hydrolysis mixture being essentially $(CH_3)_2SiCl_2$. In addition to the aforementioned diphenyl- and dimethyldichlorosilanes, the silane mixture to be hydrolyzed can contain a total of up to 1 mol percent of $R_nSiCl_{4-n}$ where R is a hydrocarbon radical and may contain up to 19 carbon atoms. Such silanes can be illustrated by vinylmethyldichlorosilane, vinyldimethylchlorosilane, trimethylchlorosilane, phenylvinylmethylchlorosilane and methyltrichlorosilane. In addition, other silanes can also be present in very minor amounts (always less than 1 mol percent total) as contaminants. It is preferred that the $(C_6H_5)_2SiCl_2$ and $(CH_3)_2SiCl_2$ make up 99.8 to 100 mol percent of the mixture of hydrolyzable silanes.

The hydrolysis is carried out in an alkaline aqueous medium at a pH of at least 12 throughout the hydrolysis, hence, large amounts of alkali metal hydroxide are employed in the hydrolysis solution. Operable alkali metal hydroxides include lithium, sodium, potassium, rubidium and cesium hydroxides. Because of ready availability as well as cost factors, sodium hydroxide and potassium hydroxide are preferred with sodium hydroxide being particularly preferred. The best results are achieved if the water used for hydrolysis is an aqueous solution containing 15 to 25 percent by weight of alkali metal hydroxide calculated on the total weight of water and alkali metal hydroxide. The solution is employed in amounts sufficient to insure that the aqueous phase will contain at least 3 percent by weight of alkali metal hydroxide after the hydrolysis reaction is completed.

Preferably, the hydrolysis of the defined mixture of chlorosilanes is added slowly, for example, in dropwise fashion, to the alkali metal hydroxide-water solution with concurrent stirring of the aqueous solution. During the addition of silane to hydrolysis medium, care should be taken to keep the reaction mixture below the boiling point of the components, hence, cooling as well as stirring is suggested.

The organosilicon hydrolyzate can be separated from the aqueous phase of the reaction mass by any desired method such as by extraction with an organic solvent which is immiscible or only slightly miscible with water followed by distillation to remove the organic solvent. Useful organic solvents for this purpose include benzene, toluene, xylene, di-n-butylether, trichloroethylene and methylenechloride. It is desirable to wash the hydrolyzates to neutrality before the solvents are distilled off to prevent subsequent loss of the phosphorous-nitrogen compounds employed as catalysts in the condensation and equilibration reaction.

The organosilicon hydrolyzates obtained as described above are partially condensed (i.e. some of the ≡SiOH groups have reacted to form SiOSi bonds with elimination of water). Thus, the next steps are, in fact, further condensation and equilibration of the organosilicon hydrolyzates. The catalysts employed for the condensation and equilibration of the organosilicon hydrolyzates are phosphorous-nitrogen compounds known as catalysts for such reactions as shown in German Patent No. 930,481 (see U.S. Pats. No. 2,830,967, issued Apr. 15, 1958; No. 2,990,419, issued June 27, 1961; No. 3,186,967 and No. 3,398,176; incorporated herein by specific reference thereto). The use of catalysts other than the defined phosphorous-nitrogen compounds for the condensation-equilibration reaction because the use of other known catalysts for such reactions results in gelation of the product and high polymers displaying crosslinking, elasticity or "nerve," hence, they are not useful for production of silicone rubbers exhibiting acceptable physical properties.

The phosphorous-nitrogen compounds employed as catalysts herein include phosphoronitrilehalides and derivatives of phosphorous acid or phosphoric acid or phosphorous acid halides or phosphoric acid halides substituted with organic groups on the nitrogen. Because of their ready availability and because they give good results, oily linear polymers of phosphoronitrilechlorides are the preferred catalysts herein. The phosphorous-nitrogen compounds are employed in catalytic quantities, usually in the range from 0.003 to 0.1 percent by weight and most preferably in the range from 0.01 to 0.05 percent by weight based on the weight of organosilicon hydrolyzate present.

If desired, other linear diorganopolysiloxanes of the general unit formula

$$R_nSiO_{\frac{4-n}{2}}$$

where R is a monovalent hydrocarbon, halogenohydrocarbon or cyanoalkyl radical can be cocondensed and equilibrated with the hydrolyzates obtained in accordance with the first reaction step described above. Thus, a hydroxyl endblocked dimethylsiloxane polymer or a copolymer of dimethylsiloxane units and vinylmethylsiloxane units with hydroxyl or triorganosiloxy endblockers can be added to the organosilicon hydrolyzates and condensed and equilibrated therewith. These other linear diorganosiloxane polymers preferably have viscosities in the range from 50 to 10,000 cs. at 25° C. and particularly 100 to 500 cs. at 25° C.

The condensation-equilibration reaction is preferably carried forward at a temperature in the range from 20° to 140° C., especially 80° to 120° C., at reduced pressures below 20 mm. Hg (abs.) with concurrent kneading of the polymer mixture. Obviously, temperatures below 20° C. can be used but the reaction is quite slow and temperatures above 140° C. can be used but the reaction becomes difficult to control and some decomposition of product will be encountered. In the range 80° C. to 120° C., the reaction will generally be completed within 30 minutes to 2 hours but reaction times from 10 minutes to 24 hours can be employed if desired and with particular polymers.

The reactions of the present invention can be carried out in batch-wise fashion or continuously, as desired. The organic solvents employed to separate the organosilicon compound from the alkali metal hydroxide-water solution is generally recovered and recycled or recirculated.

The high molecular weight diorganopolysiloxanes prepared according to the method of the present invention can be used wherever high molecular weight linear diorganosiloxane polymers are required. This includes, primarily, the known preparation of silicone elastomers by mixing high molecular weight linear diorganosiloxane polymers, generally described as diorganosiloxane gums, with fillers such as silicas and particularly reinforcing silicas having surface areas exceeding 50 m.²/g. and organic peroxides as vulcanizing agents. Other additives such as pigments, plasticizers, compression set additives, conductive metal powder or carbon blacks, flame retardants and so forth can also be present as is well known in the art and in proportions well known in the art. The mixtures so prepared can be formed by molding, extruding, sheeting, pelletizing or any other desired handling technique and heated according to known methods to vulcanize and cure to product to the ultimate elastomeric product. The high molecular weight diorganosiloxane polymers of this invention can also be used in antifoaming agents or any other place where such polymers have previously been employed.

The following examples are included herein to illustrate the invention and not to define or delineate the scope of tht invention which is properly done in the appended claims. All parts and percentages are based on weight unless otherwise stated and all viscosities were measured at 25° C. Further, the various ingredients employed can be replaced by their well-known equivalents in the organosiloxane polymer art with equivalent results being realized.

The solution of phosphoronitrilechlorides employed in the examples was prepared by heating 400 grams parts phosphoropentachloride with 130 grams of ammonium-chloride in 1000 ml. of tetrachloroethylene to 135° C. until gas evolution was terminated. The solvent was distilled off and the residue was dissolved in sufficient methylene chloride to form a 30 percent by weight solution. This is a known procedure for preparing phosphoronitrilechlorides.

EXAMPLE 1

(a) To a solution of 700 g. sodium hydroxide in 2.7 liters water was added dropwise while stirring a mixture of 190 g. diphenyldichlorosilane (0.75 mole), 871 g. dimethyldichlorosilane (6.75 mole) and 1 gram of vinylmethyldichlorosilane (0.007 mole) while the content of the reaction vessel was kept at about 50° C. by circulating water jacket for cooling. The reaction mixture was mixed with 1.5 liters benzene and shaken and the organic phase was then washed with water until the washing water was neutral. After distilling off the benzene, the hydrolyzate remained as a clear, viscous, fluid, colorless oil.

(b) A part of the hydrolyzate thus obtained was mixed with 0.05 percent by weight of the solution of phosphoronitrilechlorides and heated to 100° C. for one hour at 2 mm. Hg (abs.) in a vacuum kneader. A highly viscous and, therefore, high molecular weight diorganopolysiloxane which was not elastic and which contained up to 17 mole percent of diphenylsiloxane units was obtained.

(c) 124 grams of the hydrolyzate prepared as described under (a) was mixed with 176 grams of a copolymerizate having one Si-bonded hydroxyl group in each terminal unit and consisting of 99.9 mole percent dimethylsiloxane and 0.1 mole percent vinylmethylsiloxane units, 200 cs. at 25° C. as well as with 0.1 ml. of the phosphoronitrilechloride solution and the mixture was heated for 1 hour at 0.5 mm. Hg (abs.) to 120° C. in a vacuum kneader. The mixture of mutually immiscible diorganopolysiloxanes was at first milky-cloudy but became converted to a completely clear and colorless material within 15 minutes. A high viscosity and, therefore, high molecular weight diorganopolysiloxane which was not elastic and which consisted of up to 5.8 mole percent diphenylsiloxane units was obtained.

EXAMPLE 2

(a) To a solution of 700 grams of sodium hydroxide and 2.7 liters of water was added dropwise while stirring a mixture of 570 g. diphenyldichlorosilane (2.25 mole), 678 g. dimethyldichlorosilane (5.25 mole) and 7.0 grams of vinylmethyldichlorosilane (0.05 mole) while the content of the reaction vessel was kept at about 50° C. with a circulating water cooling jacket. The hydrolyzate was isolated according to the method described in Example 1 under (a).

(b) The hydrolyzate thus obtained was mixed with 0.05 percent by weight of the phosphoronitrilechloride solution and heated to 120° C. for 1 hour at 1 mm. Hg (abs.) in a vacuum kneader. A highly viscous and high molecular weight diorganopolysiloxane which was not elastic and which consisted of 40.5 mole percent diphenylsiloxane units was obtained.

EXAMPLE 3

Equivalent results were achieved when Example 1 was repeated employing as the starting chlorosilane mixture 50 mol percent $(C_6H_5)_2SiCl_2$ and 50 mol percent $(CH_3)_2SiCl_2$.

EXAMPLE 4

Equivalent results are achieved when Example 2(b) was repeated employing as the catalyst a chemically equivalent amount of any of the phosphorous-nitrogen compounds set forth as catalysts in German Pat. No. 930,481.

EXAMPLE 5

Equivalent results were achieved when Example 1(a) was repeated employing 1400 g. of potassium hydroxide, lithium hydroxide, rubidium hydroxide or cesium hydroxide in place of the sodium hydroxide.

That which is claimed is:

1. A method for preparing high molecular weight essentially linear diorganosiloxane polymers by (1) hydrolyzing a mixture of 4 to 70 mol percent diphenyldichlorosilane, 29 to 96 mol percent dimethyldichlorosilane and up to 1 mol percent of other chlorosilanes, the mol percentages of chlorosilanes totalling 100, by adding said mixture to an aqueous solution containing 3 to 30 percent by weight of alkali metal hydroxide, having a pH exceeding 12 and containing at least 3 percent by weight of alkali metal hydroxide throughout the hydrolysis, (2) neutralizing and separating the organosilicon hydrolyzate from the aqueous phase produced in step (1), and (3) condensing and equilibrating the organosilicon hydrolyzate by heating in the range from 20° to 140° C. under reduced pressure, in the presence of a phosphorous-nitrogen compound as catalyst until the desired degree of polymerization is achieved.

2. The method of claim 1 wherein the aqueous solution of alkali metal hydroxide contains 15 to 25 percent by weight of alkali metal hydroxide based on the total weight of the solution.

3. The method of claim 1 wherein the alkali metal hydroxide is sodium hydroxide.

4. The method of claim 2 wherein the alkali metal hydroxide is sodium hydroxide.

5. The method of claim 1 wherein the phosphorousnitrogen compound employed is an oily linear polymer of phosphoronitrilechloride.

6. The method of claim 2 wherein the phosphorousnitrogen compound employed is an oily linear polymer of phosphoronitrilechloride.

7. The method of claim 1 wherein prior to or during the condensation and equilibration step (3), diorganosiloxane polymers of the unit formula

where R is a monovalent hydrocarbon, halogenohydrocarbon or cyanoalkyl radical of 1 to 18 carbon atoms, and n is 1.99 to 2.01, having a viscosity of 50 to 10,000 cs. at 25° C. are added to the organosilicon hydrolyzate from step (2).

8. The method of claim 2 wherein prior to or during the condensation and equilibration step (3), diorganosiloxane polymers of the unit formula

where R is a monovalent hydrocarbon, halogenohydrocarbon or cyanoalkyl radical of 1 to 18 carbons atoms, and n is 1.99 to 2.01, having a viscosity of 50 to 10,000 cs. at 25° C. are added to the organosilicon hydrolyzate from step (2).

9. The method of claim 5 wherein prior to or during the condensation and equilibration step (3), diorganosiloxane polymers of the unit formula

where R is a monovalent hydrocarbon, halogenohydrocarbon or cyanoalkyl radical of 1 to 18 carbon atoms, and n is 1.99 to 2.01, having a viscosity of 50 to 10,000 cs. at 25° C. are added to the organosilicon hydrolyzate from step (2).

10. The method of claim 1 wherein step (3) is carried out at a temperature in the range from 80° to 120° C. for 30 minutes to two hours.

11. The method of claim 2 wherein step (3) is carried out at a temperature in the range from 80° to 120° C. for 30 minutes to two hours.

12. The method of claim 7 wherein step (3) is carried out at a temperature in the range from 80° to 120° C. for 30 minutes to two hours.

13. The method of claim 1 wherein the chlorosilane mixture in step (1) contains up to 1 mol percent of vinylmethyldichlorosilane.

References Cited

UNITED STATES PATENTS

| | | | |
|---|---|---|---|
| 3,274,288 | 9/1966 | Harris et al. | 260—448.2 E |
| 3,186,967 | 6/1965 | Nitzsche et al. | 260—448.2 E |
| 3,389,114 | 6/1968 | Burzynski et al. | 260—448.2 E |
| 3,493,595 | 2/1970 | Strasser et al. | 260—448.2 E |

PATRICK P. GARVIN, Primary Examiner

W. F. W. BELLAMY, Assistant Examiner